(12) United States Patent
Dohi

(10) Patent No.: US 9,143,642 B2
(45) Date of Patent: Sep. 22, 2015

(54) IMAGE PROCESSING APPARATUS, IMAGE PROCESSING APPARATUS CONTROL METHOD, AND STORAGE MEDIUM

(71) Applicant: CANON KABUSHIKI KAISHA, Tokyo (JP)

(72) Inventor: Makoto Dohi, Naka-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 13/842,383

(22) Filed: Mar. 15, 2013

(65) Prior Publication Data
US 2013/0258392 A1    Oct. 3, 2013

(30) Foreign Application Priority Data
Mar. 29, 2012   (JP) ................. 2012-077291

(51) Int. Cl.
*G06K 15/00* (2006.01)
*H04N 1/00* (2006.01)
*H04N 1/44* (2006.01)

(52) U.S. Cl.
CPC ....... *H04N 1/00408* (2013.01); *H04N 1/00472* (2013.01); *H04N 1/00482* (2013.01); *H04N 1/00514* (2013.01); *H04N 1/00517* (2013.01); *H04N 1/4406* (2013.01); *H04N 2201/0094* (2013.01)

(58) Field of Classification Search
CPC ... G06F 3/0482; G06F 9/4443; G06F 3/0481; G06F 3/04817
USPC ................. 358/1.14, 1.16, 1.15, 1.1
See application file for complete search history.

(56) References Cited

U.S. PATENT DOCUMENTS

| | | | | |
|---|---|---|---|---|
| 2005/0015498 | A1* | 1/2005 | Okazawa et al. | 709/227 |
| 2007/0019226 | A1* | 1/2007 | Matsuura et al. | 358/1.14 |
| 2007/0136293 | A1* | 6/2007 | Mizumukai | 707/9 |
| 2009/0279135 | A1* | 11/2009 | Harada | 358/1.15 |
| 2011/0161881 | A1* | 6/2011 | Tomita et al. | 715/825 |
| 2012/0320410 | A1* | 12/2012 | Kakegawa | 358/1.15 |

FOREIGN PATENT DOCUMENTS

JP         2008-182295 A         8/2008

* cited by examiner

*Primary Examiner* — Martin Mushambo
(74) *Attorney, Agent, or Firm* — Canon U.S.A., Inc. IP Division

(57) ABSTRACT

In an image processing apparatus, a usage state of a setting item that is set to execute a job is stored for each user. Another setting item corresponding to a setting item having a high usage frequency by the authenticated user is notified to the user. Further, a determination is made regarding whether to notify the user of a new function added to the image processing apparatus based on the usage state of the user.

15 Claims, 18 Drawing Sheets

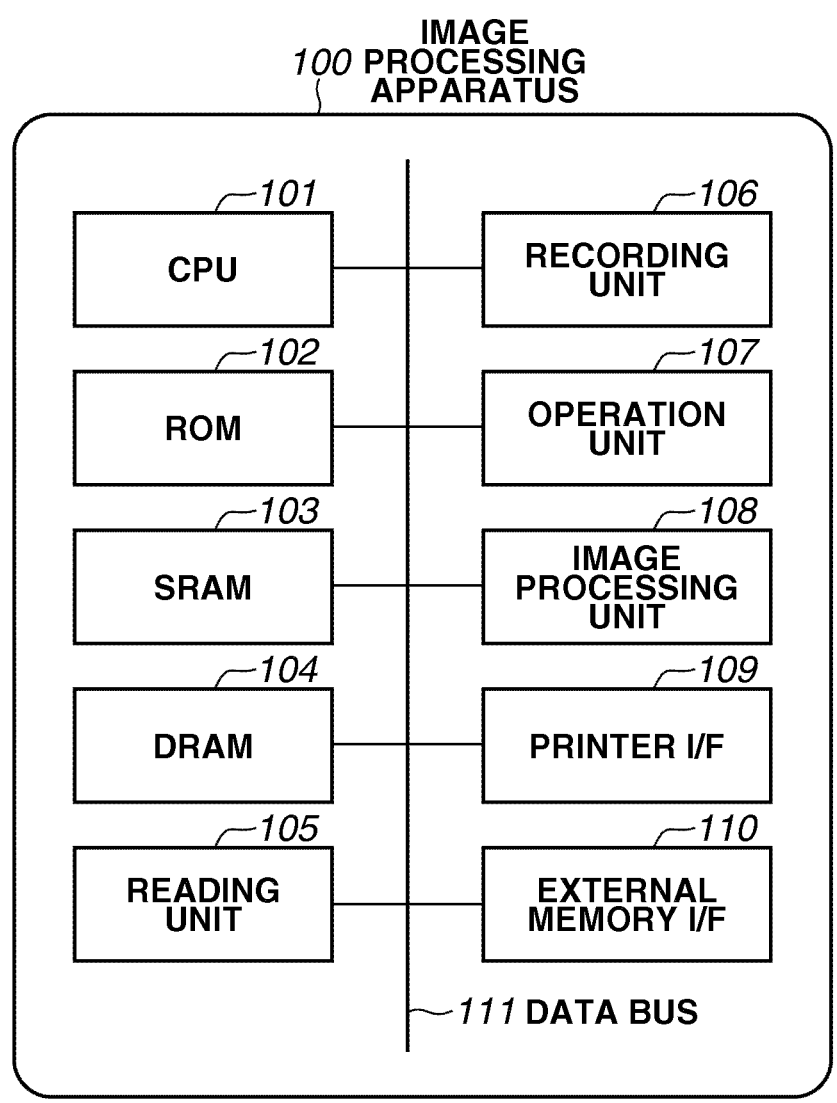

FIG.2

| USER ID (201) | CLASSIFICATION (202) | FIRST COUNT NUMBER (203) | SETTING ITEM (204) | SECOND COUNT NUMBER (205) |
|---|---|---|---|---|
| 0001 | COPY | 0010 | TWO-SIDED | 0005 |
| | | | REDUCTION LAYOUT | 0000 |
| | | | SORT | 0001 |
| | | | ENLARGEMENT/REDUCTION | 0001 |
| | | | OTHER | 0000 |
| | SEND | 0001 | FILE FORMAT | 0000 |
| | | | RESOLUTION | 0000 |
| | | | DOCUMENT SIZE | 0000 |
| | | | OTHER | 0000 |
| 0002 | COPY | 0005 | TWO-SIDED | 0000 |
| | | | REDUCTION LAYOUT | 0000 |
| | | | SORT | 0001 |
| | | | ENLARGEMENT/REDUCTION | 0000 |
| | | | OTHER | 0000 |
| | SEND | 0005 | FILE FORMAT | 0003 |
| | | | RESOLUTION | 0002 |
| | | | DOCUMENT SIZE | 0000 |
| | | | OTHER | 0000 |
| 0003 | COPY | 0002 | TWO-SIDED | 0000 |
| | | | REDUCTION LAYOUT | 0000 |
| | | | SORT | 0000 |
| | | | ENLARGEMENT/REDUCTION | 0000 |
| | | | OTHER | 0000 |
| | SEND | 0010 | FILE FORMAT | 0000 |
| | | | RESOLUTION | 0000 |
| | | | DOCUMENT SIZE | 0007 |
| | | | OTHER | 0000 |

FIG.5

| CLASSIFICATION | SETTING ITEM | OTHER ASSOCIATED SETTING ITEMS | PRIORITY | POP-UP EXECUTION STATE |
|---|---|---|---|---|
| COPY | TWO-SIDED | REDUCTION LAYOUT | 1 | NOT EXECUTED |
| | | SORT | 2 | NOT EXECUTED |
| | | ENLARGEMENT/REDUCTION | 3 | NOT EXECUTED |
| | | OTHER | 4 | NOT EXECUTED |
| | REDUCTION LAYOUT | TWO-SIDED | 1 | NOT EXECUTED |
| | | SORT | 2 | NOT EXECUTED |
| | | ENLARGEMENT/REDUCTION | 3 | NOT EXECUTED |
| | | OTHER | 4 | NOT EXECUTED |
| | SORT | SHIFT | 1 | EXECUTED |
| | | ROTATE | 2 | NOT EXECUTED |
| | | STAPLE | 3 | NOT EXECUTED |
| SEND | FILE FORMAT | RESOLUTION | 1 | EXECUTED |
| | | DOCUMENT SIZE | 2 | EXECUTED |
| | | DENSITY ADJUSTMENT | 3 | NOT EXECUTED |
| | RESOLUTION | FILE FORMAT | 1 | EXECUTED |
| | | DOCUMENT SIZE | 2 | NOT EXECUTED |
| | | DENSITY ADJUSTMENT | 3 | NOT EXECUTED |
| | DOCUMENT SIZE | FILE FORMAT | 1 | EXECUTED |
| | | DOCUMENT SIZE | 2 | NOT EXECUTED |
| | | DENSITY ADJUSTMENT | 3 | NOT EXECUTED |

FIG.7A
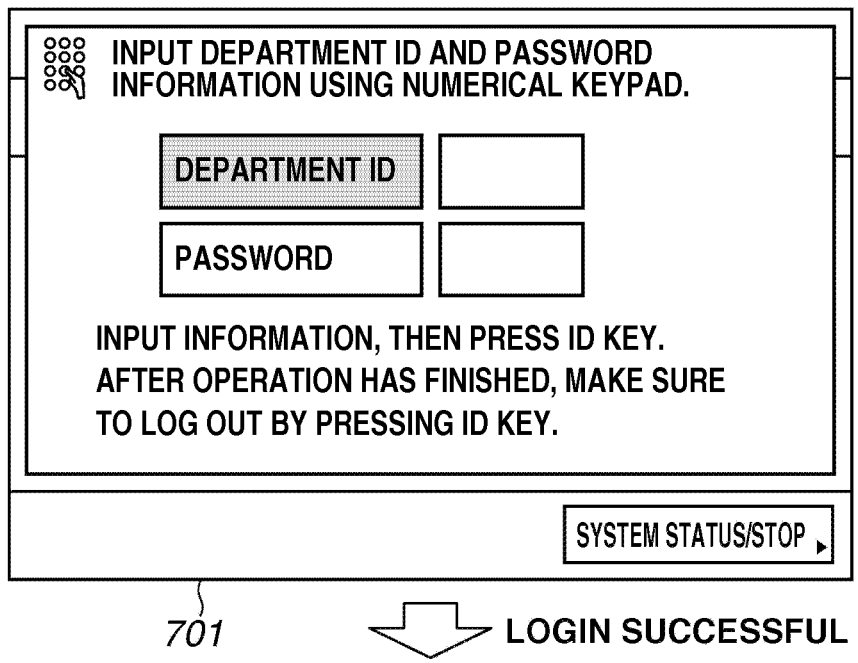
701
⇩ LOGIN SUCCESSFUL
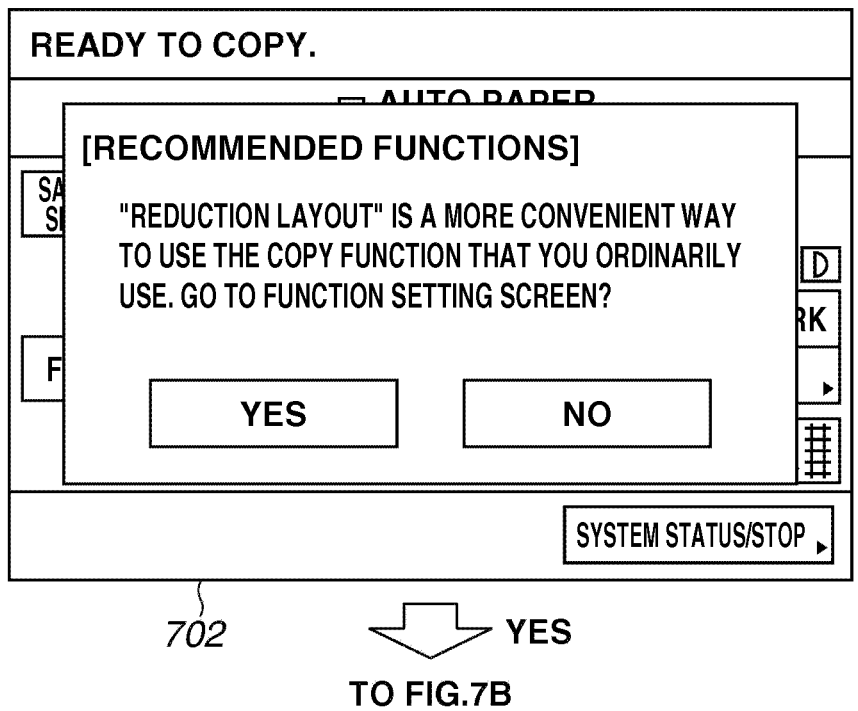
702   ⇩ YES
TO FIG.7B

FIG.7B
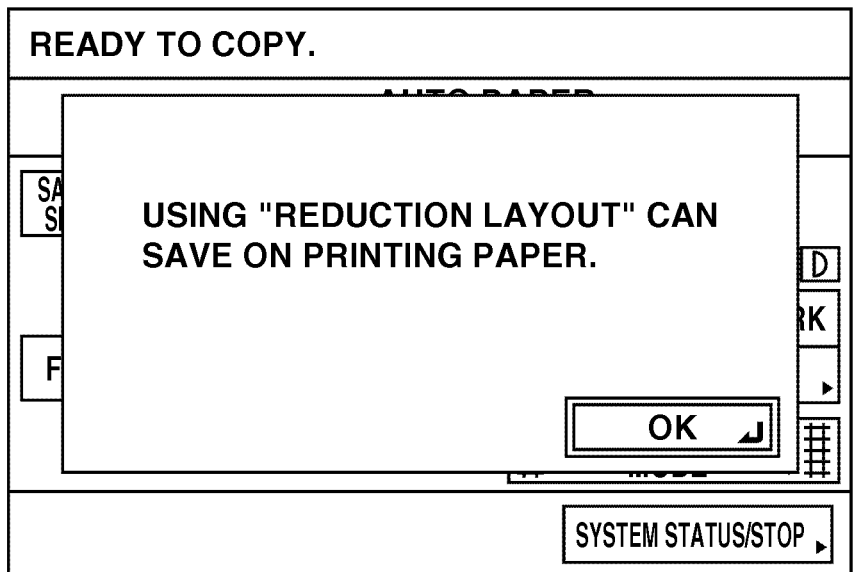
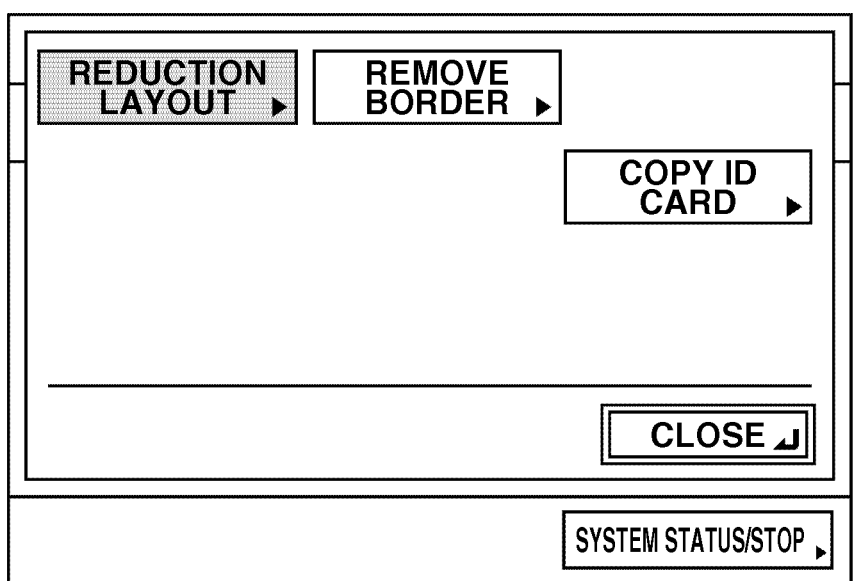

FIG.7C

FROM FIG.7B
⇩

[REDUCTION LAYOUT] SELECT DOCUMENT SIZE.

A4    A5    B5    TWO-SIDED DOCUMENT

▶ INCH SIZE

CANCEL SETTING    ◀ BACK    NEXT ▶

SYSTEM STATUS/STOP ▶

705

[REDUCTION LAYOUT] SELECT LAYOUT TYPE.

2 in 1
4 in 1

▶ ADVANCED SETTINGS    ▶ TWO-SIDED COPYING

CANCEL SETTING    ◀ BACK    NEXT ▶

SYSTEM STATUS/STOP ▶

706    ⇩ NEXT
TO FIG.7D

FIG.7D
FROM FIG.7C
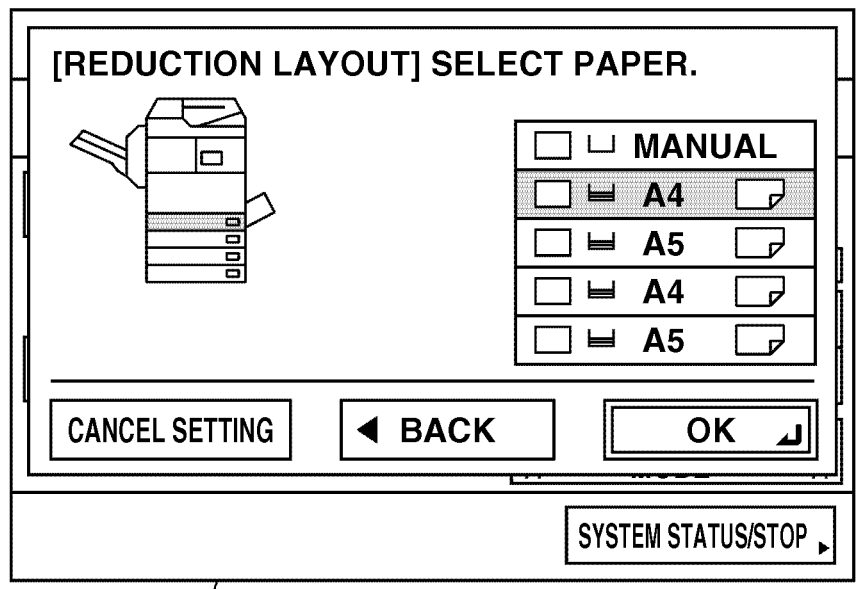
707
OK
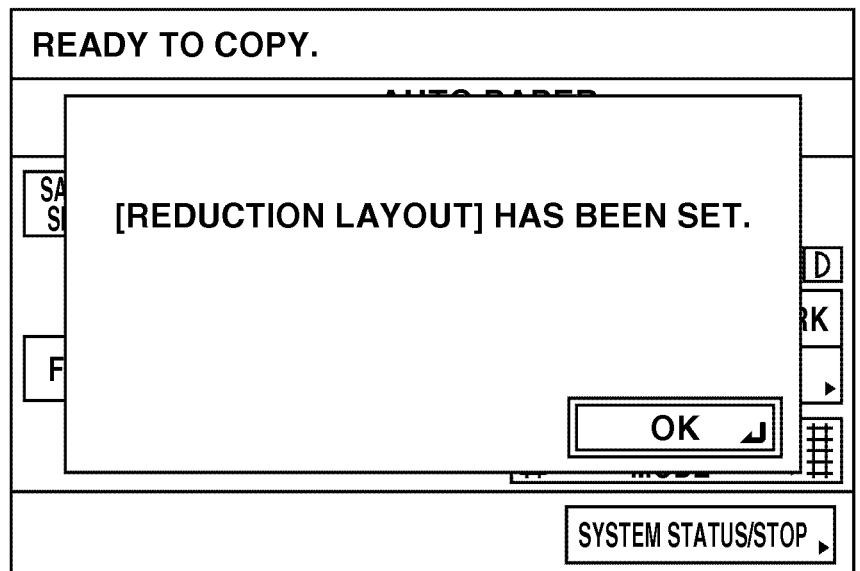
708
OK
TO FIG.7E

FIG.7E

FROM FIG.7D

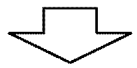

```
READY TO COPY. (WITH SETTINGS)        CONFIRM SETTINGS ▶

AUTO%          ☐ A4 ☐                              1

SAME    MAGNIFICATION ▶   PAPER
  SIZE                      SELECTION ▶
                                       ◁ ı ı ı ı | ı ı ı ▷
                                       LIGHT  AUTO  DARK
  FINISHING ▶    TWO-SIDED ▶           TEXT/PHOTO      ▶

▦ APPLICATION ▦
                                         MODE       ▶

SYSTEM STATUS/STOP ▶
```

709 COPY BASIC SCREEN 2

```
READY TO COPY.

100%          ☐ AUTO PAPER                         1
              ☐ A4 ☐

SAME    MAGNIFICATION ▶   PAPER
  SIZE                      SELECTION ▶
                                       ◁ ı ı ı ı | ı ı ı ▷
                                       LIGHT  AUTO  DARK
  FINISHING ▶    TWO-SIDED ▶           TEXT/PHOTO      ▶

▦ APPLICATION ▦
                                         MODE       ▶

SYSTEM STATUS/STOP ▶
```

710 COPY BASIC SCREEN 1

FIG.10

| USER ID (1001) | CLASSIFICATION (1002) | SETTING ITEM (1003) | FUNCTION ADDITION POP-UP EXECUTION STATE (1004) |
|---|---|---|---|
| 0001 | COPY | TWO-SIDED | EXECUTED |
| | | REDUCTION LAYOUT | NOT EXECUTED |
| | | SORT | NOT EXECUTED |
| | | ENLARGEMENT/REDUCTION | NOT EXECUTED |
| | | OTHER | NOT EXECUTED |
| | SEND | FILE FORMAT | EXECUTE NEXT TIME (NEW FUNCTION) |
| | | RESOLUTION | NOT EXECUTED |
| | | DOCUMENT SIZE | NOT EXECUTED |
| | | OTHER | NOT EXECUTED |
| 0002 | COPY | TWO-SIDED | NOT EXECUTED |
| | | REDUCTION LAYOUT | NOT EXECUTED |
| | | SORT | NOT EXECUTED |
| | | ENLARGEMENT/REDUCTION | NOT EXECUTED |
| | | OTHER | NOT EXECUTED |
| | SEND | FILE FORMAT | EXECUTED |
| | | RESOLUTION | NOT EXECUTED |
| | | DOCUMENT SIZE | NOT EXECUTED |
| | | OTHER | NOT EXECUTED |
| 0003 | COPY | TWO-SIDED | NOT EXECUTED |
| | | REDUCTION LAYOUT | EXECUTE NEXT TIME (NEW FUNCTION) |
| | | SORT | NOT EXECUTED |
| | | ENLARGEMENT/REDUCTION | NOT EXECUTED |
| | | OTHER | NOT EXECUTED |
| | SEND | FILE FORMAT | NOT EXECUTED |
| | | RESOLUTION | NOT EXECUTED |
| | | DOCUMENT SIZE | NOT EXECUTED |
| | | OTHER | NOT EXECUTED |

FIG.12A
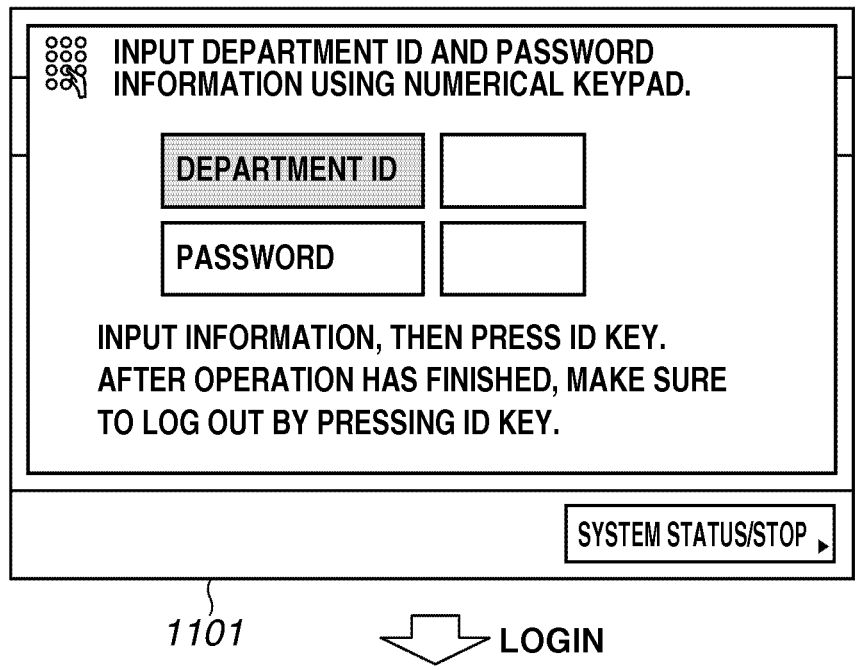
1101 ⬇ LOGIN
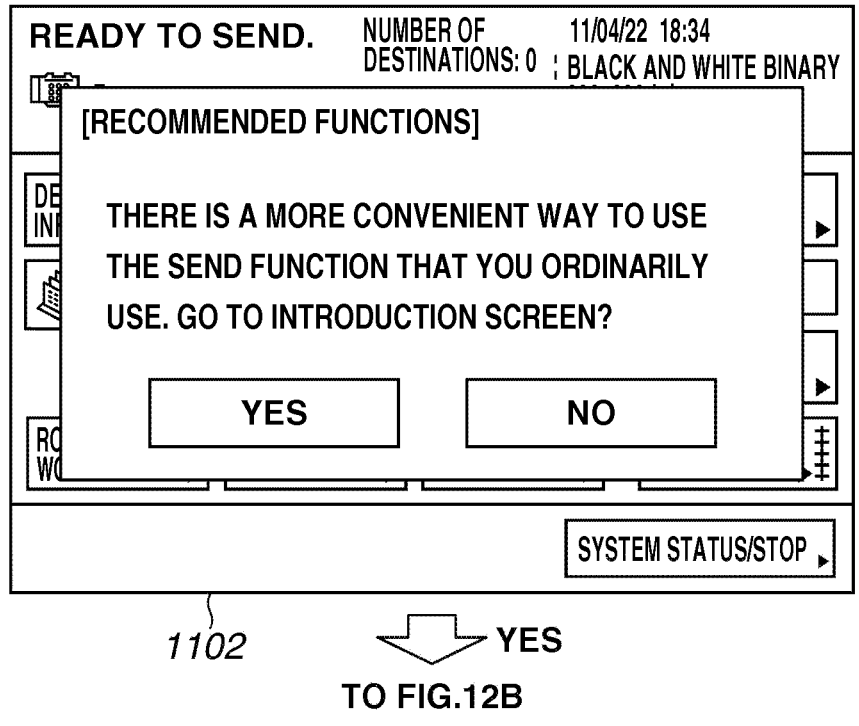
1102 ⬇ YES
TO FIG.12B

FIG.12B

FROM FIG.12A

[FILE FORMAT]

"PDF (OCR)" HAS BEEN ADDED.

CLOSE

☐ SPLIT AT EACH PAGE     CLOSE ⏎

ID  AFTER OPERATION HAS FINISHED, MAKE SURE TO LOG OUT BY PRESSING ID KEY.     SYSTEM STATUS/STOP ▶

1103     ⬇ CLOSE

[FILE FORMAT]

■ BLACK AND WHITE BINARY

| TIFF | PDF | PDF (OCR) |

■ COLOR

| JPEG | PDF | PDF (HIGH COMPRESSION) |
| PDF (OCR) | PDF (HIGH COMPRESSION+OCR) | |

☐ SPLIT AT EACH PAGE     CLOSE ⏎

ID  AFTER OPERATION HAS FINISHED, MAKE SURE TO LOG OUT BY PRESSING ID KEY.     SYSTEM STATUS/STOP ▶

1104     ⬇ CLOSE

FROM FIG.12B

| READY TO SEND. | NUMBER OF DESTINATIONS: 0 | 11/04/22 18:34 BLACK AND WHITE BINARY 200 × 200 dpi AUTO |

DETAILED INFORMATION ▶ | ERASE ▶ | CALL ▶ | READING SETTING ▶

DESTINATION TABLE ▶ | DESTINATION SEARCH (SERVER) ▶ | TIFF

FILE FORMAT ▶

ROUTINE WORK BUTTON ▶ | ONE-TOUCH BUTTON ▶ | NEW DESTINATION ▶ | SEND SETTING ▶

SYSTEM STATUS/STOP ▶

*1105*

[FILE FORMAT]

■ BLACK AND WHITE BINARY

| TIFF | PDF |

■ COLOR

| JPEG | PDF | PDF (HIGH COMPRESSION) |

☐ SPLIT AT EACH PAGE | CLOSE ↵

ID | AFTER OPERATION HAS FINISHED, MAKE SURE TO LOG OUT BY PRESSING ID KEY. | SYSTEM STATUS/STOP ▶

*1104-2* SETTING SCREEN BEFORE ADDING NEW FUNCTION (PDF (OCR))

IMAGE PROCESSING APPARATUS, IMAGE PROCESSING APPARATUS CONTROL METHOD, AND STORAGE MEDIUM

BACKGROUND OF THE INVENTION

1. Field of the Invention

Aspects of the present invention generally relate to an image processing apparatus, an image processing apparatus control method, and a storage medium.

2. Description of the Related Art

An image processing apparatus, as represented by a copying machine and a multifunction peripheral, is capable of executing various jobs, such as printing, copying, faxing, sending and the like. When executing a job, a user can set various setting items, such as two-sided printing and reduction layout (2-in-1 and 4-in-1). Further, the user can also add a new function to the image processing apparatus acquiring a firmware update or acquiring a new license. As a technology for notifying a user of such various functions, Japanese Patent Application Laid-Open No. 2008-182295 discusses a technology in which all users who are remotely operating an updated function are notified.

However, image processing apparatus users might not necessarily use all of the image processing apparatus functions. One user might only use two-sided printing, while another user might use two-sided printing and reduction layout. Therefore, if all users are notified of an update to a function in the image processing apparatus, like in Japanese Patent Application Laid-Open No. 2008-182295, this means that unnecessary notifications of an updated function will be frequently issued to users who require no such updated function.

SUMMARY OF THE INVENTION

According to an aspect of the present invention, an image processing apparatus capable of executing a job includes an authentication unit configured to authenticate a user, a storage unit configured to store for each user a usage state of a setting item that is set to execute the job, a processing unit configured to add a new function to the image processing apparatus, a determination unit configured to determine whether to notify the user authenticated by the authentication unit of the new function based on information stored in the storage unit, and a notification unit configured to, if it is determined by the determination unit to notify the user authenticated by the authentication unit of the new function, notify the user of the new function.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating a configuration of an image processing apparatus according to an exemplary embodiment.

FIG. 2 illustrates an example of a database in which users are registered.

FIG. 5 illustrates an example of user information managed for each user.

FIGS. 7A, 7B, 7C, 7D and 7E illustrate examples of UI screens each displayed on a display unit in an operation unit.

FIG. 10 illustrates an example of a database in which users are registered.

FIGS. 12A, 12B, and 12C illustrate examples of UI screens each displayed on a display unit in an operation unit.

DESCRIPTION OF THE EMBODIMENTS

Figure 3:
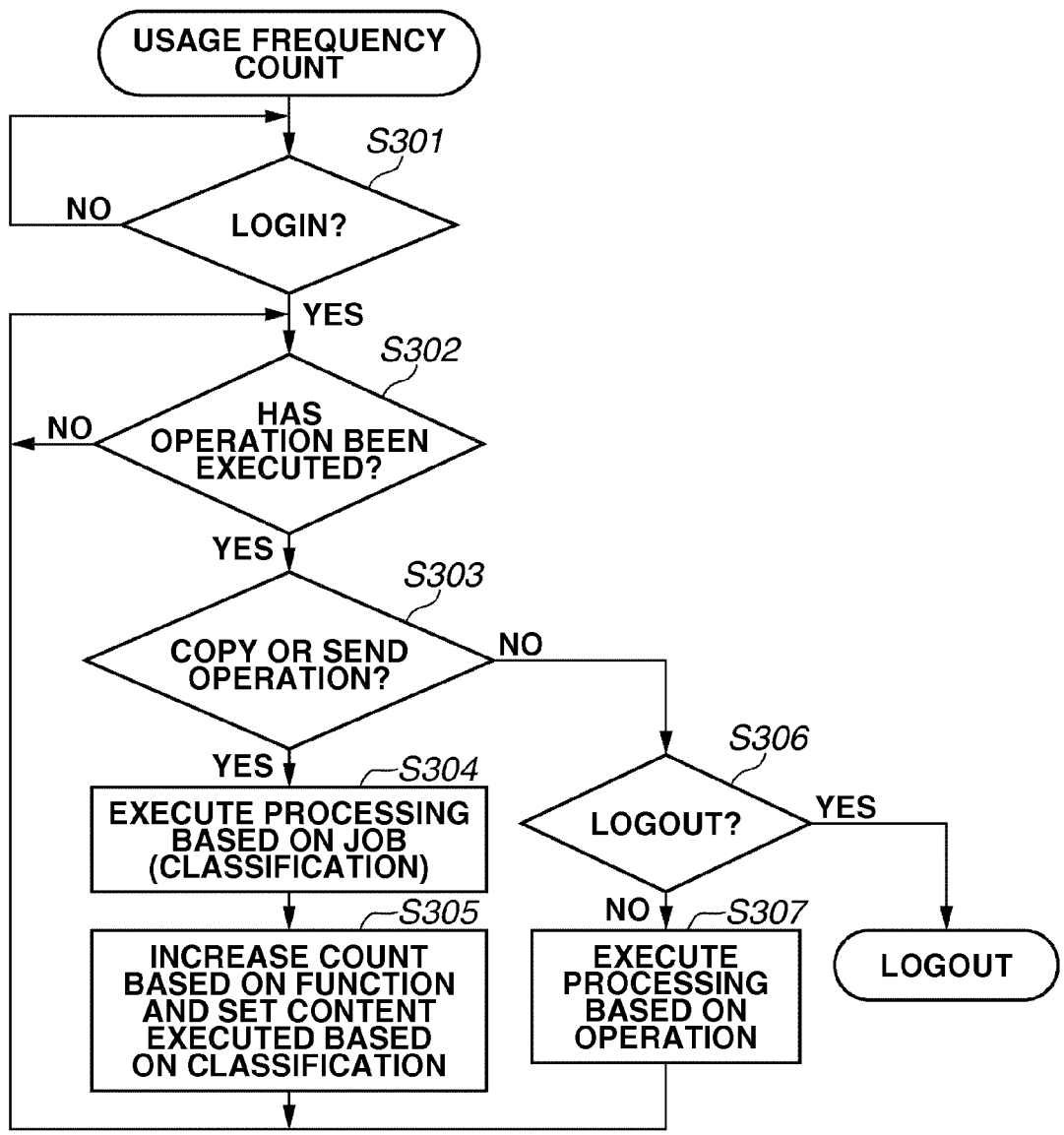
FIG. 3 is a flowchart illustrating a control method of an image processing apparatus.

Various exemplary embodiments, features, and aspects of the invention will be described in detail below with reference to the drawings.

<System Configuration Description>

FIG. 1 is a block diagram illustrating a configuration of an image processing apparatus according to an exemplary embodiment. In the present exemplary embodiment, although an image processing apparatus 100 executing a job is described based on the configuration of a copying machine as an example, the image processing apparatus 100 may be configured as a single-function apparatus that only has a copy function or a printing function, or may be configured as a multifunction peripheral (MFP).

In FIG. 1, a central processing unit (CPU) 101 is a system control unit that controls the overall image processing apparatus. A read-only memory (ROM) 102 is for storing control programs for the CPU 101. A static random access memory (SRAM) 103 stores data and information, such as setting values registered by a user logged in to the image processing apparatus, image processing apparatus management data, information about the functions and settings used by the user, and image data read by a reading unit 105.

A dynamic random access memory (DRAM) 104 is for temporarily storing program control variables, for example. The reading unit 105 is to read image data and to convert the read image data into binary data, thereby performing document reading in a copy function. A recording unit 106 is to print and output the image data read by the reading unit 105 on recording paper. The recording unit 106 includes a printer engine that supports various printing methods. Further, the present exemplary embodiment is applicable when the image processing apparatus 100 is capable of executing post-processing of the sheets output from the recording unit 106.

An operation unit 107 includes a display unit configured from a touch panel that also has a function for displaying information about the image processing apparatus, for example, and a user interface unit that includes buttons, such as a numerical keypad, that are operated by the user to similarly perform settings in the image processing apparatus.

An image processing unit 108 performs encoding and decoding processing of image data handled in copying, for example. The image processing unit 108 also includes a copy image variable magnification processing unit.

A printer interface (I/F) 109 is an interface section between an external device and a host apparatus, such as a local area network (LAN) (Ethernet) and a universal serial bus (USB), for example. An external memory interface (I/F) 110 is an interface section with external media, such as a Flash memory and a USB memory. Further, both of these sections are connected to the CPU 101 via a data bus 111.

FIG. 2 illustrates an example of a database, in which users are registered, stored in the SRAM 103 which is illustrated in FIG. 1. The present exemplary embodiment is an example illustrating a state in which results obtained by counting how many times each function or setting has been used by each user who is logged in to the image processing apparatus 100 are stored in a database, for example, as an image of a table. Further, although the database is described as being stored in the SRAM 103 of FIG. 1, the database can be recorded by a method other than recording in the SRAM 103, as long as such method employs a non-volatile recording unit.

In FIG. 2, a user ID 201 is an ID number that is assigned to each user capable of logging in to the image processing apparatus 100. In the present exemplary embodiment, the table illustrated in FIG. 2 is created by classifying and recording image processing functions set or selected by the users, and separately recording for each user a display history of the image processing functions to be displayed on an initial operation screen.

The user ID 201 is assigned as a unique number for each user. In the image processing apparatus 100, various information associated with each user is stored by linking to the user ID 201.

Now, the various information linked to the user having the user ID 201 "0001" will be described. In column 202, which indicates a "classification", an example is illustrated of the functions of the image processing apparatus 100 that have been classified into broad classifications in the column direction. In the present exemplary embodiment, to simplify the description, the image processing apparatus will be described as having two functions, "copy" and "send", such as facsimile and E-mail.

In column 203, which indicates a first count number, results are shown that were obtained by counting how many times each function indicated by the classification 202 has actually been used by the user logged in to the image processing apparatus 100 (execution count). For example, if the user actually uses the copy function, when the copied print result is output, the first count number 203 of "copy" in the classification 202 is counted up one by the CPU 101. In column 204, which indicates setting items, setting items that can be set by the users when executing a plurality of functions belonging to the classification 202 are shown in the column direction.

In FIG. 2, an example is illustrated in which the image processing apparatus 100 according to the present exemplary embodiment includes "two-sided", "reduction layout", "sort", "enlargement/reduction", and "other" as the setting items 204 for "copy" in the classification 202.

Further, an example is illustrated in which the image processing apparatus 100 according to the present exemplary embodiment includes "file format", "resolution", "document size", and "other" as the setting items 204 for "send" in the classification 202. In column 205, which indicates a second count number, an example is shown of results obtained by counting how many times each setting item 204 has actually been used by the users. For example, when the user actually uses the copy function, when two-sided copying is set and a print result is output, the second count number 205 of "two-sided" for the setting item 204 is counted up one by the CPU 101.

How the table illustrated in FIG. 2 is updated will now be described with reference to FIG. 3. FIG. 3 is a flowchart illustrating a control method of an image processing apparatus according to the present exemplary embodiment. Each step in the processing is realized by the CPU 101 executing a control program stored in the ROM 102 illustrated in FIG. 1.

Figure 4:
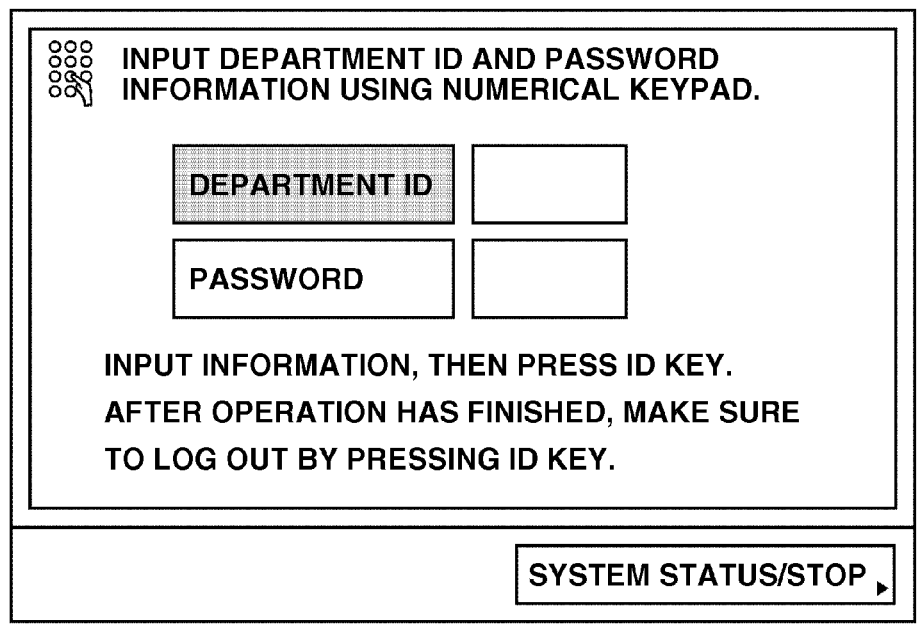
FIG. 4 illustrates an example of a user interface (UI) screen displayed on a display unit in an operation unit.

First, the user logs in to the image processing apparatus 100 by using a button or a display unit in the operation unit 107 of the image processing apparatus 100. The authentication method is not especially limited. Since the authentication method performed during log in does not influence the effects of the present exemplary embodiment, a detailed description of this method is omitted herein. In the present exemplary embodiment, the CPU 101 identifies each user who logs in based on the user ID in the image processing apparatus 100. More specifically, a method is employed in which the CPU 101 displays a login screen illustrated in FIG. 4 as a UI screen on the display unit in the operation unit 107, and the user inputs his/her department ID and password. In this case, the department ID is the user ID assigned to the user who logs in. Thus, the present exemplary embodiment is configured so that authentication can be performed separately for each user or department who is trying to operate the image processing apparatus by using the authentication screen illustrated in FIG. 4.

In step S301 of FIG. 3, the CPU 101 waits for the user to log in to the image processing apparatus 100. If it is determined that the user has successfully logged in (YES in step S301), the processing proceeds to step S302.

In step S302, the CPU 101 waits for the user who logged in to execute some kind of operation, or execute a copy or send operation, or execute a log out operation. Then, in step S303, the CPU 101 determines what the operation performed by the user in step S302 was, and splits the processing based on the determined result. For example, in step S303, if the CPU 101 determines that the operation executed in step S302 by the user using the UI screen was an operation for executing copy or send, the processing proceeds to step S304, while if that operation is included in some other operations, the processing proceeds to step S306.

In step S306, the CPU 101 determines whether the operation performed in step S302 is a log out operation. If it is determined that the operation is a log out operation (YES in step S306), the CPU 101 executes log out processing of the user, and finishes the processing performed in this flowchart. On the other hand, if it is determined that the operation performed in step S302 is not a log out operation (NO in step S306), the processing proceeds to step S307. In step S307, the CPU 101 executes processing based on the operation executed by the user, and the processing then returns to step S302. An example of the processing would be when the user designates the number of copies by a keypad operation, for example.

In step S304, the CPU 101 executes copy processing by controlling the reading unit 105, the image processing unit 108, and the recording unit 106, or processing for sending image data by controlling the printer I/F 109. Further, in step S304, in addition to such processing, the CPU 101 counts up the count value of the first count number 203 configured to "copy" or "send" indicated in the classification 202 illustrated in FIG. 2 based on the number of processes. What is counted up here by the CPU 101 is the first count number 203 of the classification 202 corresponding to the user ID 201 of the user who is currently logged in.

In step S305, the CPU 101 determines which of the setting items 204 illustrated in FIG. 2 the setting content set during the execution of the copying or sending performed in step S304 corresponds to, and counts up the second count number 205 corresponding to that setting item 204. For example, if the user with the user ID 0001 executed two-sided copying, the CPU 101 counts up the second count number 205 corresponding to the setting item "two-sided" where the classification 202 for the user ID 201 "0001" is "copy".

Thus, the actual number of processes performed while the user is logged in is divided according to the classification 202 and the setting item 204, and stored and managed as a record of that user in the table of FIG. 2.

Next, how other setting items that are associated with setting items that are normally frequently used are displayed based on information about the each user's record stored in the table of FIG. 2 as described above will be described with reference to a table illustrated in FIG. 5 and a flowchart illustrated in FIG. 6. Especially in the present exemplary embodiment, an example is described based on a case in which, when the users are logged in to the image processing apparatus 100, the image processing apparatus 100 is in a state in which the copy function can be used. Obviously, by changing a (not illustrated) setting, the image processing apparatus 100 may also be in a state in which a send function can be used when the users are logged in to the image processing apparatus 100.

FIG. 5 illustrates an example of user information in which each item in the setting items 204 illustrated in FIG. 2 is managed for each user. In the present exemplary embodiment, the user information is recorded and managed in a similar recording apparatus to that illustrated in FIG. 2. The CPU 101 manages which other functions and settings the setting items 502 corresponding to the respective items in the setting items 204 illustrated in FIG. 2 are associated with, and the respective priorities of such associated functions and settings as a priority 504. A pop-up execution state 505 stores an execution state of a pop-up display that informs the user of information about a below-described recommended function or setting by the CPU 101. In FIG. 5, "executed" represents information indicating whether a pop-up of a recommended function that is beneficial to the user has been displayed on the operation unit 107.

The example illustrated in FIG. 5 is prepared for each user logged in to the image processing apparatus 100. FIG. 5 according to the present exemplary embodiment relates to the user having the user ID 0001. Further, although the data illustrated in FIG. 5 is, similar to the data illustrated in FIG. 2, stored in the SRAM 103 illustrated in FIG. 1, the data in the table can be stored by a method other than storing in the SRAM 103, as long as such method employs a non-volatile storage unit.

The information in each column illustrated in FIG. 5 will now be described in more detail. In FIG. 5, a classification 501 is the same as the classification 202 illustrated in FIG. 2. The classification 501 represents broad classifications of the functions that the image processing apparatus 100 has. The image processing apparatus 100 according to the present exemplary embodiment has two types of function, "copy" and "send". Setting items 502 are the same as the setting items 204 illustrated in FIG. 2. Other associated setting items 503 indicate "setting items" that are respectively associated with each item in the column direction of the setting items 502. For example, four "setting items" are associated with "two-sided" in the setting items 502, "reduction layout", "sort", "enlargement/reduction", and "other".

The priority 504 represents in the column direction the level of priority among the other associated setting items 503. This priority is information used to determine what order to perform the pop-up displays that inform the user of information about the below-described recommended setting item. For example, in the other associated setting items 503 that are associated with "two-sided" for the setting item 502 of "copy" in the classification 501, the CPU 101 performs the pop-up displays in the order "reduction layout" whose priority is "1"→"sort" whose priority is "2"→"enlargement/reduction" whose priority is "3"→"other" whose priority is "4". The reason why "reduction layout" is the recommended setting item with the highest priority for "two-sided" is as follows. Since the user who specifies "two-sided" probably specifies "two-sided" in order to reduce the number of sheets used in printing, "reduction layout", which similarly reduces the number of sheets, is also a desirable setting item for the user who specifies "two-sided". The pop-up execution state 505 stores information indicating whether the pop-up displays informing the user of information about a below-described recommended setting item have been executed or not.

Figure 6:
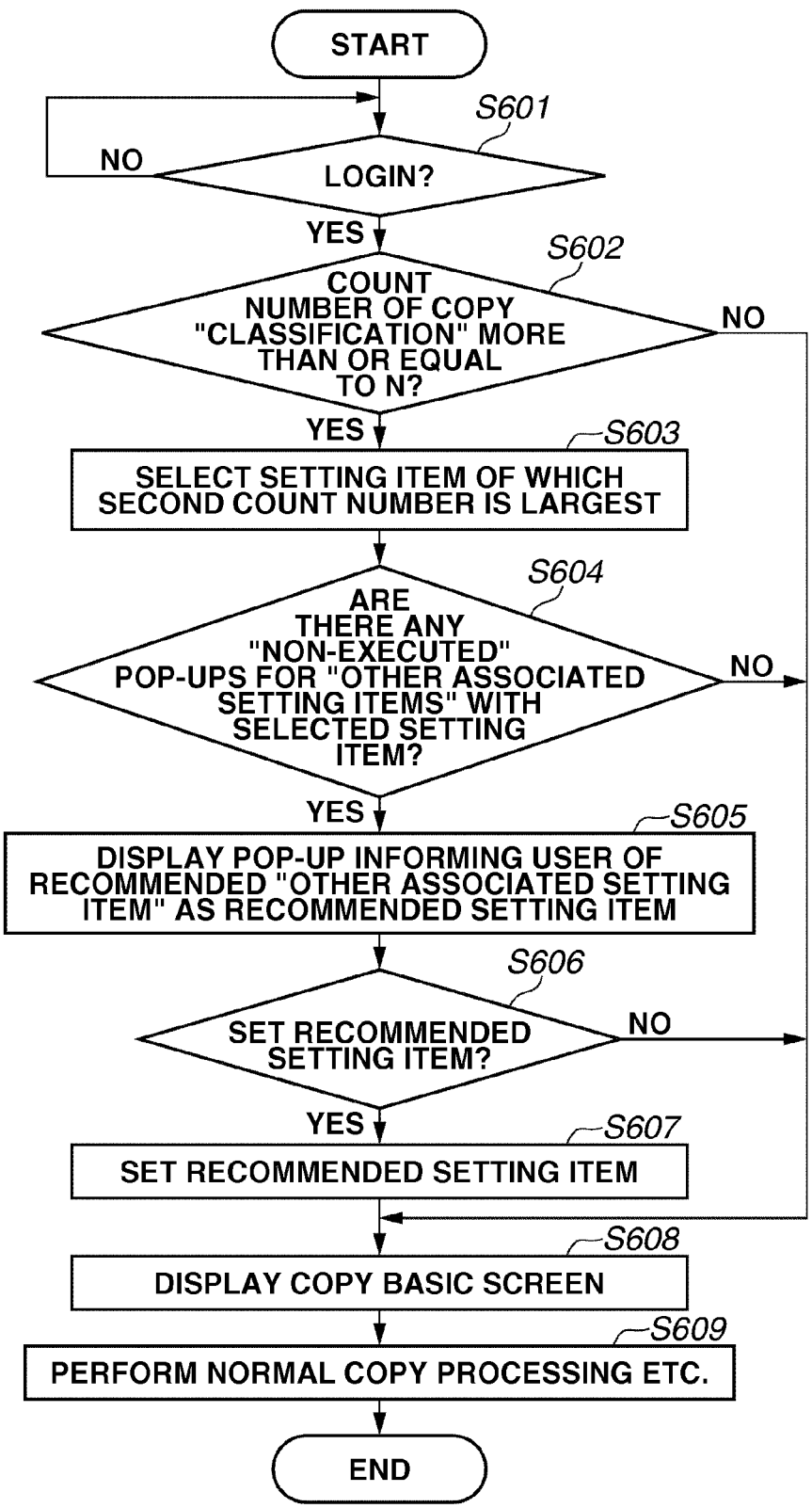
FIG. 6 is a flowchart illustrating a control method of an image processing apparatus.

FIG. 6 is a flowchart illustrating a control method of an image processing apparatus according to the present exemplary embodiment. Each step in the processing is realized by the CPU 101 executing a control program stored in the ROM 102 illustrated in FIG. 1. First, similar to the processing illustrated in FIG. 3, the user logs in to the image processing apparatus 100 by using a button or a display unit in the operation unit 107 of the image processing apparatus 100.

In step S601, the CPU 101 waits for the user to log in to the image processing apparatus 100. If it is determined that the user has successfully logged in (YES in step S601), the processing proceeds to step S602.

In step S602, the CPU 101 determines whether the first count number 203 for copy in the classification 202 corresponding to the logged in user having the user ID 201 in the table illustrated in FIG. 2 is equal to or more than a predetermined threshold (usage number threshold) N. In the present exemplary embodiment, N is 30. Further, in the exemplary embodiment, the usage number threshold N is a variable that is set separately for each user or department, and can be arbitrarily set by an administrator.

In step S603, the CPU 101 selects the setting item having the largest second count number 205 among the setting items 204 for copy in the classification 202 corresponding to the logged in user having the user ID 201 illustrated in FIG. 2.

In the present exemplary embodiment, as illustrated in FIG. 2, based on a case in which the user having the user ID 201 "0001" is logged in, since the CPU 101 determines that the setting item having the largest second count number 205 among the setting items 204 for copy in the classification 202 is "two-sided", in step S603, the CPU 101 selects "two-sided" as the setting item having the highest usage frequency.

The CPU 101 looks up in the table illustrated in FIG. 5 the other associated setting items 503 corresponding to "two-sided" in the setting items 204 selected in step S603 in order of (smaller value) higher priority 504. Then, in step S604, the CPU 101 determines whether the pop-up execution state 505 of each priority is non-executed.

In the present exemplary embodiment, in step S603, the "two-sided" of "0001" corresponding to the user ID 201 was selected from the table illustrated in FIG. 2. Consequently, the CPU 101 firstly determines whether the "pop-up execution state" of the "reduction layout" with the priority 504 of "1" among the other associated setting items 503 illustrated in FIG. 5 is indicated as non-executed. In this case, since the "reduction layout" in the table illustrated in FIG. 5 is indicated as non-executed (YES in step S604), the determination result in step S604 is "reduction layout".

However, if the CPU 101 determines that the pop-up execution state 505 of the "reduction layout" is "executed", the CPU 101 determines whether the pop-up execution state 505 for "sort", which has the priority 504 of the second highest priority, "2", is non-executed.

Thus, the CPU 101 looks up in order the other associated setting items 503 in FIG. 5 to see whether each pop-up execution state 505 of the other associated setting items 503 is non-executed. If the CPU 101 determines that there is not even one pop-up execution state 505 that is non-executed (NO in step S604), the result of step S604 is determined to be that there are no non-executed other associated setting items 503, so the processing proceeds to step S608.

In step S605, the CPU 101 displays the below-described UI screens illustrated in FIGS. 7A, 7B, 7C, 7D and 7E as pop-ups on the display unit of the operation unit 107 based on the result of step S604. In the present exemplary embodiment, since "reduction layout" is the determination result of step S604, the CPU 101 displays a message recommending setting of "reduction layout" on the display unit of the operation unit 107 as a pop-up. Like the control program, the data for the pop-up displayed based on the determination result is stored in the ROM 102 illustrated in FIG. 1.

In step S606, since either a message to set the recommended setting item (in this example, "reduction layout") is displayed on the pop-up screen displayed in step S605 or a message to return to normal processing is displayed, the CPU 101 determines which of these messages is selected by the user. If the CPU 101 determines that, based on this message, the user selected to set the recommended setting item (YES in step S606), the processing proceeds to step S607. In step S607, the CPU 101 sets the recommended setting item as the setting when executing copying. In the present exemplary embodiment, the CPU 101 sets "reduction layout".

When the setting of "reduction layout" in step S607 is completed, in step S608, the CPU 101 controls switching of the display of the display unit in the operation unit 107 to the basic copy screen displayed for a normal copy operation. Then, in step S609, the CPU 101 executes copy processing or some other functions (e.g., the send function) based on an operation from the user, and finishes the processing illustrated in this flowchart.

Next, the operations based on the flowchart illustrated in FIG. 6 will be described with reference to FIGS. 7A to 7E based on screen transitions illustrated on the display unit in the operation unit 107. FIGS. 7A to 7E illustrate examples of user interface screens each displayed on a display unit in the operation unit 107. The screen display states will now be described in more detail based on the screen display control that is based on the steps illustrated in FIG. 6. FIGS. 7A to 7E illustrate examples of screens 701 to 710.

In FIG. 7A, a screen 701 is displayed before the user logs in to the image processing apparatus 100. This screen 701 corresponds to step S601 of the flowchart illustrated in FIG. 6. On the screen 701, the user input his/her department ID and password using the operation unit 107. If the CPU 101 determines (authenticates) that this content is correct (i.e., login is successful), the CPU 101 transitions the screen display content to a screen 702. From the time the user logs in to the image processing apparatus 100 until the screen 702 is displayed, the series of processes from steps S602 to S608 of the flowchart illustrated in FIG. 6 is performed.

Further, a pop-up screen is displayed on the screen 702 illustrated in FIG. 7A asking whether the recommended setting item, which was determined in the processing from steps S602 to S606 of the flowchart illustrated in FIG. 6, is to be set. By executing processing based on the procedure illustrated in FIG. 6, the CPU 101 can, after displaying the initial operation screen to the authenticated user, display a screen that introduces a setting item to be recommended to the user based on the usage state of the setting items for each user recorded in the recording unit. The screen displayed below the pop-up illustrated on the screen 702 corresponds to the operation screen displaying on the display unit the initial operation screen for each user to match the image processing function set or selected by the authenticated user based on operation screen control performed by the CPU 101.

A message and buttons are displayed on the screen 702 illustrated in FIG. 7A that leads the user who is logged in to the image processing apparatus 100 to select whether to execute (set) the function recommended by the CPU 101. If the CPU 101 determines that the user logged in to the image processing apparatus 100 has pressed a "No" button on the screen 702 illustrated in FIG. 7A, the CPU 101 controls switching of the display screen to a screen 710 illustrated in FIG. 7E. Consequently, a copy basic screen 1 is displayed on the display unit of the operation unit 107, and normal processing is subsequently performed. This screen transition corresponds to the processing performed in steps S606, S608, and S609 in FIG. 6. Further, if there have been no instructions from the user for a predetermined period after the screen introducing the image processing function was displayed based on the recommend processing function executed by the CPU 101, an operation screen control unit executes control for switching the display unit screen to a display screen.

On the other hand, if the user pressed a "Yes" button on the screen 702 illustrated in FIG. 7A, the screen transitions to a screen 703 illustrated in FIG. 7B, and a "reduction layout" setting is performed based on the operations illustrated in the following screens 704 illustrated in FIG. 7B to 708 illustrated in FIG. 7D. The series of processes for performing the setting of "reduction layout" corresponds to step S609 in FIG. 6. Since the operation for setting "reduction layout" does not influence the effects of the present exemplary embodiment, a detailed description of this operation will not be given here.

If it is determined that the CPU 101 has completed the setting of "reduction layout" based on the operations up to screen 708 illustrated in FIG. 7D, the CPU 101 controls so as to transition the display screen to a screen 709 illustrated in FIG. 7E, which serves as a copy basic screen, and subsequent operation is as normal. Since a copy basic screen 2 corresponding to screen 709 illustrated in FIG. 7E displays the fact that "reduction layout" has been set, the display content is different from the basic screen 1 for the copy function configured to screen 710. The transitions to the screen 709 and the screen 710 correspond to the processing performed in step S610 of FIG. 6.

According to the above exemplary embodiment, the usage frequency of the functions and settings used by each user who is logged in to the image processing apparatus 100 is counted, and based on that count result, a separate function or setting associated with the functions or settings that the user normally uses is recommended. In contrast, when a new function or setting is added to the image processing apparatus 100, if the added function or setting matches the usage frequency of the functions and settings used by each user, a similar effect can be obtained even by recommending the added function or setting.

Further, an effective image processing function or a new image processing function to be added that should be recommended based on how the user operates the image processing functions that are used can be notified at a suitable timing.

Figure 8:
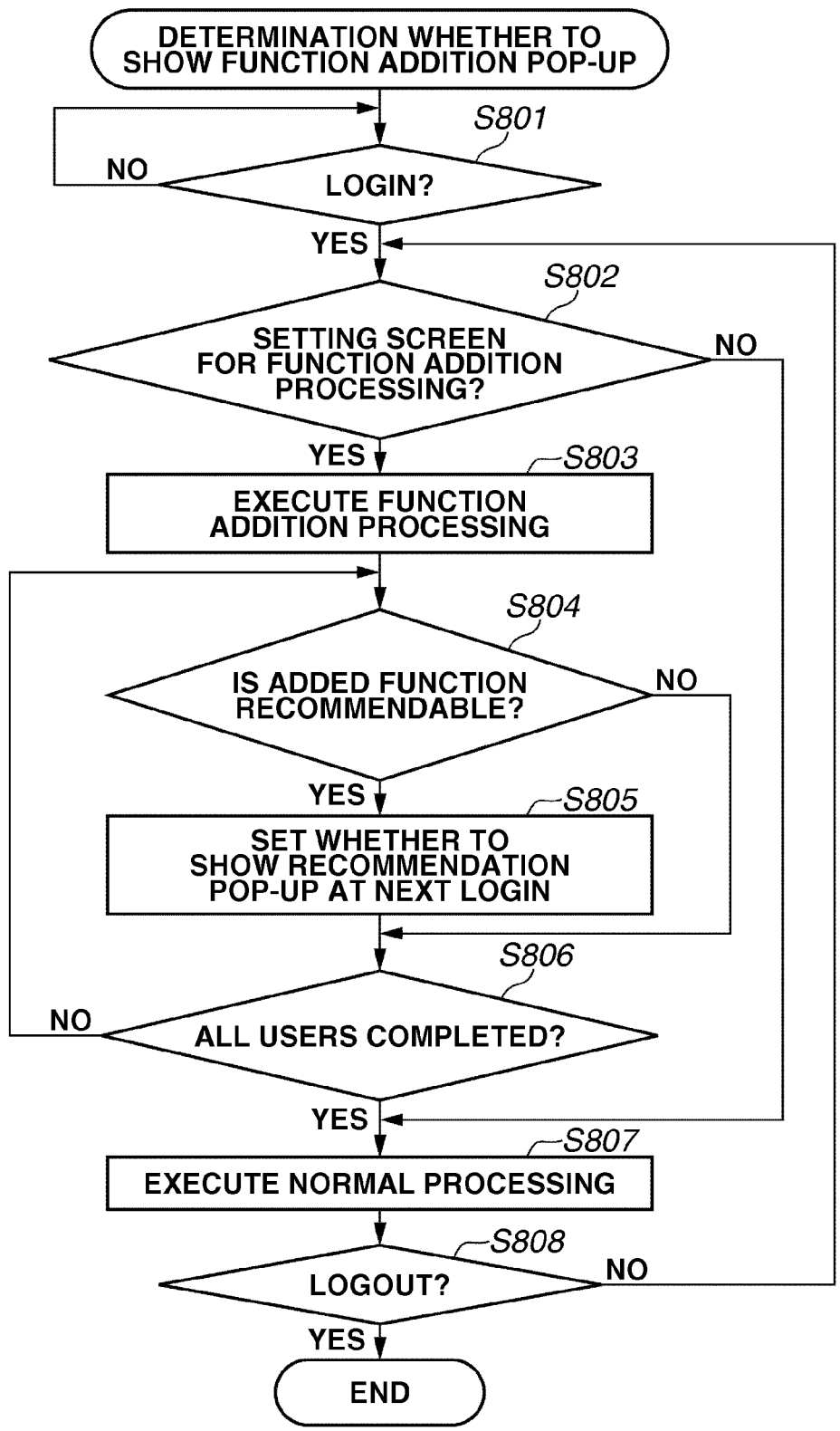
FIG. 8 is a flowchart illustrating a control method of an image processing apparatus.

FIG. 8 is a flowchart illustrating a control method of an image processing apparatus according to the present exemplary embodiment. Each step in the processing is realized by the CPU 101 executing a control program stored in the ROM 102 illustrated in FIG. 1.

First, the user logs in to the image processing apparatus 100 by using a button or a display unit in the operation unit 107 of the image processing apparatus 100. In step S801, the CPU 101 waits for the user to log in to the image processing apparatus. If it is determined that the user has successfully logged in (YES in step S801), the processing proceeds to step S802. In step S802, the CPU 101 determines whether the screen has transitioned to a setting screen for performing processing to add a function to the image processing apparatus 100 based on an operation (not illustrated) performed by the user. If it is determined by the CPU 101 that the screen has transitioned to a screen for performing processing to add a function to the image processing apparatus 100 (YES in step S802), the processing proceeds to step S803. If it is determined by the CPU 101 that the screen has not transitioned to a screen for performing processing to add a function to the image processing apparatus 100 (NO in step S802), the processing proceeds to step S807 for executing some other processing.

In step S803, the user executes (operates) processing to add a function to the image processing apparatus 100. For example, the user inputs a multi-digit license number on a UI screen like that illustrated in FIG. 9. This is processing (an operation) that enables a screen to display a function, which was not displayed previously in order to prevent users who had not been recognized by this license number while it was a specific function already included in the image processing apparatus 100, as a usable function even by that user. Further, although in this exemplary embodiment a case is illustrated in which the license number is a simple four-digit number string, for example, the license number may be a combination of symbols, roman letters and the like. The method for adding a new function to the image processing apparatus 100 is not limited to inputting a license number. An example of another method includes adding a new function based on a firmware update. From the perspective of the user using the image processing apparatus 100 based on the processing of step S803, this still means that a new function is added to the image processing apparatus 100.

Moreover, in the present exemplary embodiment, the added function may be used by any user, as long as that user can log in to the image processing apparatus 100.

In step S804, the CPU 101 determines whether the added function is a function that should be recommended to each user who can log in to the image processing apparatus 100. This determination regarding whether the function is a function that should be recommended uses the table illustrated in FIG. 2 described in the first exemplary embodiment.

Since it is recorded in the table illustrated in FIG. 2 how frequently the functions and settings of the image processing apparatus 100 are used by each user, the CPU 101 can determine the functions and settings that have a high usage frequency for each user. Therefore, if there an association between the functions having a high usage frequency for each user and the function added in step S803, the CPU 101 can determine that the function added in step S803 is a function that should be recommended.

In the present exemplary embodiment, when a new function is added, an association is made regarding which function that function corresponds to among the setting items 204. For example, if a function newly added in step S803 is "OCR", an association is made regarding the fact that "OCR" is a function corresponding to "file format" among the setting items 204. If the new function is added by inputting a license number or by a firmware update, this association is automatically performed based on information included in an update program file, for example.

In step S804, the CPU 101 determines whether to notify the user of the function added in step S803 as a recommended function. Describing this by using the above example, if the newly added function is "OCR", if the second count number 205 of "file format" in the setting items 204 is equal to or more than a predetermined threshold, the CPU 101 determines to notify the user of the function added in step S803 as a recommended function (YES in step S804). Although in the present exemplary embodiment the predetermined threshold is set at "15", the threshold may be some other values. Then, in step S805, the CPU 101 sets so that a recommendation pop-up is shown in order to notify the user of the added function as a recommended function. On the other hand, if the second count number 205 of "file format" in the setting items 204 is less than the predetermined threshold, the CPU 101 determines not to notify the user of the function added in step S803 as a recommended function (NO in step S804).

In steps S804 and S805, the CPU 101 determines whether to recommend the function added in step S803 to each user who can log in to the image processing apparatus 100 based on a determination like that described above, and stores that result as a table illustrated in FIG. 10.

FIG. 10 illustrates an example of a database in which users are registered that is stored in the SRAM 103 illustrated in FIG. 1. This is an example that illustrates which "function/setting" to be recommended with a pop-up when each user who can log in to the image processing apparatus 100 next logs in. In the present exemplary embodiment, the table illustrated in FIG. 10 is created and stored in the SRAM 103 by the CPU 101 recording separately for each user the display history of the updated or added image processing functions to be displayed on the initial operation screen. Further, although the database is illustrated as being recorded in the SRAM 103 of FIG. 1, the database can be recorded by a method other than recording in the SRAM 103, as long as such method employs a non-volatile recording unit.

In FIG. 10, the setting information in a user ID 1001, classification 1002, and setting items 1003 columns have the same meaning as already described in FIGS. 2 and 5. A function addition pop-up execution state 1004 is information indicating whether to recommend the function added in step S803 with a pop-up to the user when he/she next logs in based on the determination performed in step S804, or indicating with a pop-up that the recommendation has been executed or non-executed. Specifically, if the CPU 101 determined in step S804 to recommend the function added in step S803, in step S805, the CPU 101 changes the function addition pop-up execution state 1004 in the setting item 1003 illustrated in FIG. 10 to "execute next time (new function)".

The portion "(new function)" in "execute next time (new function)" is, for example, a concrete name of the function added in step S803 of FIG. 8. In the processing performed in the below-described flowchart illustrated in FIG. 11, this portion is used to determine what pop-up should be displayed.

Since the processing performed in steps S804 and S805 is performed on all users who can log in to the image processing apparatus 100, in step S806, the CPU 101 determines whether the processing of steps S804 and S805 has completed for all users. If it is determined that the processing has not completed (NO in step S806), the processing returns to step S804.

When the processing up to step S806 is thus completed (YES in step S806), in step S807, the CPU 101 performs normal copy or send processing based on the set content.

In step S808, the CPU 101 determines whether the user who is logged in to the image processing apparatus 100 has performed a log out operation. If it is determined that the logged in user has not performed a log out operation (NO in step S808), the processing returns to step S802. If it is determined that the logged in user has performed a log out operation (YES in step S808), the CPU 101 performs log out processing, and the user logs out from the image processing apparatus 100.

Figure 11:
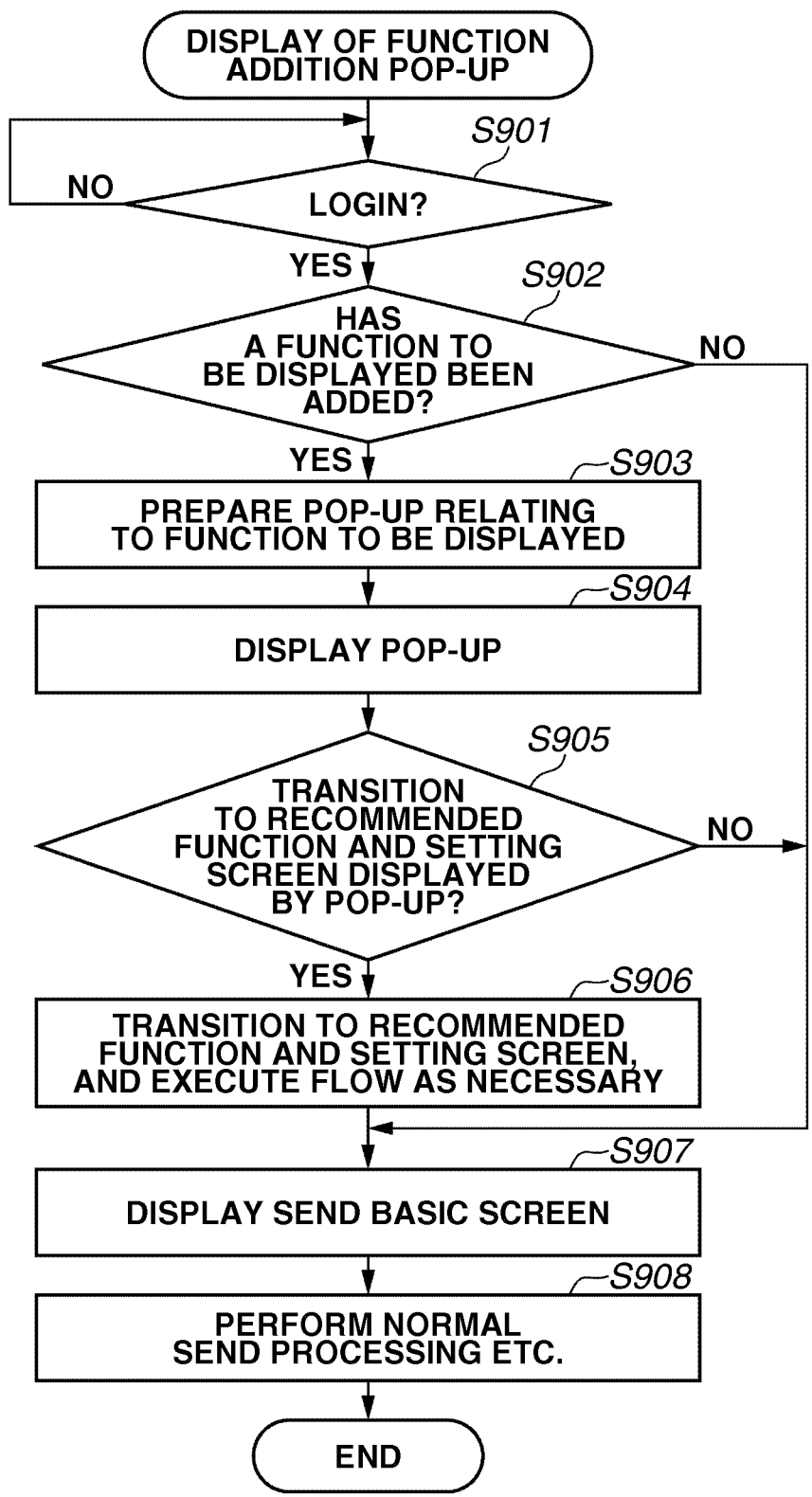
FIG. 11 is a flowchart illustrating a control method of an image processing apparatus.

FIG. 11 is a flowchart illustrating a control method of an image processing apparatus according to the present exemplary embodiment. The present exemplary embodiment is a processing example that displays a pop-up recommending the function added in step S803 of FIG. 8 based on the table illustrated in FIG. 10 that was set in step S805 illustrated in FIG. 8. Each step in the processing is realized by the CPU 101 executing a control program stored in the ROM 102 illustrated in FIG. 1.

First, the user logs in to the image processing apparatus 100 by using a button or a display unit in the operation unit 107 of the image processing apparatus 100. In step S901, the CPU 101 waits for the user to log in to the image processing apparatus. When the user has successfully logged in (YES in step S901), the processing proceeds to step S902.

In step S902, the CPU 101 determines whether to display a pop-up recommending the added function to the user logged in to the image processing apparatus 100 based on the table illustrated in FIG. 10.

Specifically, if the user ID of the user logged in to the image processing apparatus 100 is "0001", and if that user tries to execute the send function, the CPU 101 confirms the content of the function addition pop-up execution state 1004 corresponding to "send" in the classification 1002 for the user ID 1001 that is "0001" in the table illustrated in FIG. 10. Based on the confirmation, the CPU 101 determines whether there are any portions in which the content of the function addition pop-up execution state 1004 is "execute next time (new function)". If it is determined by the CPU 101 that there are no portions in which the content of the function addition pop-up execution state 1004 is "execute next time (new function)" (NO in step S902), the processing proceeds to step S907.

On the other hand, if it is determined by the CPU 101 in step S902 that there is a portion of "execute next time (new function)" (YES in step S902), the processing proceeds to step S903. In step S903, the CPU 101 prepares data for the pop-up to be displayed on the display unit in the operation unit 107 based on information about this found "new function".

In the present exemplary embodiment, the data for the pop-up to be displayed is stored in the ROM 102 illustrated in FIG. 1. While the ROM 102 is used to store the data, any other storage location that would enable practice of the present exemplary embodiment is applicable.

In step S904, the CPU 101 executes control to actually display the pop-up recommending the function added in step S803 of FIG. 8 on the display unit in the operation unit 107 using the pop-up data prepared in step S903. Specifically, by executing recommendation function display control based on the procedure illustrated in FIG. 11, the CPU 101 displays the initial operation screen to an authenticated user, and then displays a screen introducing the updated or added image processing function to be recommended to the user or the department based on the display history.

In step S904, a choice for asking the user whether to proceed to an operation such as setting the recommended function or to cancel is simultaneously displayed on the pop-up displayed on the display unit in the operation unit 107. Consequently, the CPU 101 splits the processing in step S905 based on the result selected by the user on a popped-up UI screen.

If it is determined by the CPU 101 that the user selected performing an operation such as setting the recommended function (YES in step S905), the processing proceeds to step S906. If it is determined by the CPU 101 that the user selected to cancel (NO in step S905), the processing proceeds to step S907.

In step S906, the CPU 101 performs the setting of the recommended function, for example, on the UI screen displayed as a pop-up, and the processing then proceeds to step S907. In step S907, the CPU 101 displays a basic screen for performing the send processing in the flowchart illustrated in FIG. 11 to be performed after normal login. Then, in step S908, the CPU 101 executes sending based on the settings performed by the user on a send basic screen displayed in step S907, executes other functions or performs other settings, and then finishes the processing performed in this flowchart.

Next, the transition state of the screens displayed on the display unit in the operation unit 107 will be described based on the flowchart illustrated in FIG. 11 with reference to FIGS. 12A to 12C. FIGS. 12A to 12C illustrate examples of user interface screens each displayed on a display unit in the operation unit 107 illustrated in FIG. 1. The examples illustrated in FIGS. 12A to 12C include screens 1101 to 1104, 1104-2 and 1105. In FIG. 12A, a screen 1101 is displayed before the user logs in to the image processing apparatus 100. Specifically, this screen 1101 corresponds to the screen displayed in step S901 of the flowchart illustrated in FIG. 9.

Figure 9:
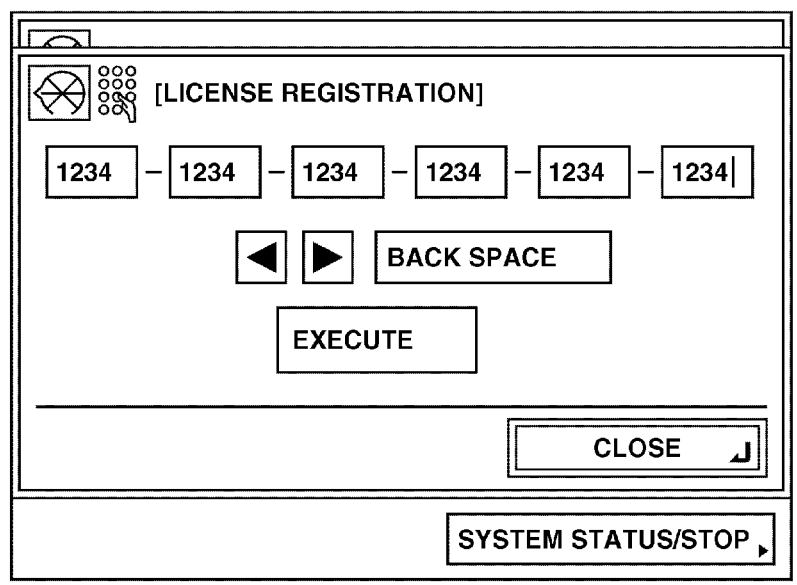
FIG. 9 illustrates an example of a UI screen displayed on a display unit in an operation unit.

On the screen 1101, if the user inputs his/her department ID and password, and the CPU 101 determines that the input content is correct (i.e., login is successful), the display screen transitions to a screen (notification screen) 1102. From the time the user logs in to the image processing apparatus 100 until the screen 1102 is displayed, the series of processes from steps S902 to S904 of the flowchart illustrated in FIG. 9 is performed. However, if it is determined by the CPU 101 in step S902 not to display a pop-up, the screen transitions to a screen 1105. The screen 1105 corresponds to step S907 in the flowchart illustrated in FIG. 9.

If the user who has logged in to the image processing apparatus 100 on the screen 1102 selects the button corresponding to "Yes" displayed on the screen, the screen proceeds to the displays of screens 1103 and then to 1104 illustrated in FIG. 12B, and the user performs setting of the recommended function, for example. On the other hand, if the user logged in to the image processing apparatus 100 selects the button corresponding to "No" displayed on the screen, the CPU 101 transitions the display screen to a screen 1105 illustrated in FIG. 12C.

The screen transitions performed when the recommended function is "PDF (OCR)" in the "file format" setting for send are illustrated in screens 1103 to 1104 of FIG. 12B. A screen 1104-2 illustrated in FIG. 12C is for performing the "file format" setting for "send" before the "PDF (OCR)" function is added to the image processing apparatus 100. On a screen 1104, if the user presses one of the setting items for "file format" (e.g., the recommended "PDF (OCR)"), and then presses a "Close" button, the CPU 101 transitions the display screen to the screen 1105. Such processing corresponds to the processing performed in steps S906 to S907 in the flowchart illustrated in FIG. 11.

Consequently, an effective image processing function or a new image processing function to be added that should be recommended based on how the user operates the image processing functions that are used can be notified at a suitable timing. Further, a normal operation screen used by the user can be updated to a selectable operation screen that includes a recommended image processing function.

Embodiments of the present invention can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-077291 filed Mar. 29, 2012, which is hereby incorporated by reference herein in its entirety.

What is claimed is:

1. A printing apparatus comprising:
   a printing unit configured to perform printing processing;
   an authentication unit configured to authenticate a user;
   a storage unit configured to store a usage number of times the user uses a specific setting item associated with the printing processing;
   a processing unit configured to add a new function to the printing apparatus;
   a determination unit configured to determine whether to notify the user authenticated by the authentication unit of the new function based on the usage number of times stored in the storage unit; and
   a notification unit configured to, if it is determined by the determination unit to notify the user authenticated by the authentication unit of the new function, notify the user of the new function.

2. The printing apparatus according to claim 1, wherein the notification unit is configured not to, if it is determined by the determination unit not to notify the user authenticated by the authentication unit of the new function, notify the user of the new function.

3. The printing apparatus according to claim 1, wherein the notification unit is configured to display a notification screen for notifying the user of the new function.

4. The printing apparatus according to claim 3, wherein the notification unit is configured to display the notification screen if it is determined by the determination unit to notify the user authenticated by the authentication unit of the new function, and not to display the notification screen if it is determined by the determination unit not to notify the user authenticated by the authentication unit of the new function.

5. The printing apparatus according to claim 1, wherein in a case where the usage number of times stored in the storage unit is larger than a predetermined number, the determination unit determines to notify the user authenticated by the authentication unit of the new function.

6. The printing apparatus according to claim 1, wherein the processing unit is configured to add the new function to the printing apparatus based on an update of the printing apparatus.

7. The printing apparatus according to claim 1, wherein the processing unit is configured to add the new function to the printing apparatus based on input of a license number.

8. The printing apparatus according to claim 1, wherein the storage unit is configured to store a usage number of times the user uses a setting item associated with the printing processing, for each of a plurality of the setting items,
   the printing apparatus further comprising:
   a specification unit configured to specify the specific setting item associated with the new function from among the plurality of setting items,
   wherein the determination unit determines whether to notify the user authenticated by the authentication unit of the new function based on the usage number of times the user uses the specific setting item specified by the specification unit.

9. A printing apparatus comprising:
   a printing unit configured to perform printing processing;
   an authentication unit configured to authenticate a user;
   a storage unit configured to store a usage number of times the user uses a setting item associated with the printing processing, for each of a plurality of the setting items;
   a specification unit configured to specify a setting item having a largest usage number of times from among the plurality of setting items; and
   a notification unit configured to notify the user authenticated by the authentication unit of a recommended setting item associated with the setting item specified by the specification unit.

10. The printing apparatus according to claim 9, wherein the notification unit is configured to display a notification screen for notifying the user of the recommended setting item.

11. The printing apparatus according to claim 9, further comprising:
    a determination unit configured to determine whether the recommended setting item has been notified to the user,
    wherein if it is determined by the determination unit that the recommended setting item has not been notified to the user, the notification unit notifies the user of the recommended setting item, and if it is determined by the determination unit that the recommended setting item has been notified to the user, the notification unit does not notify the user of the recommended setting item.

12. A method for controlling a printing apparatus, the method comprising:
    performing printing processing;
    authenticating a user;
    storing a usage number of times the user uses a specific setting item associated with the printing processing;
    adding a new function to the printing apparatus;
    determining whether to notify the authenticated user of the new function based on the stored usage number of times; and
    notifying, if it is determined to notify, the authenticated user of the new function.

13. A non-transitory computer-readable storage medium storing a program for causing a computer to execute the method according to claim 12.

14. A method for controlling a printing apparatus, the method comprising:

performing printing processing;
authenticating a user;
storing a usage number of times the user uses a setting item associated with the printing processing, for each of a plurality of the setting items;
specifying a setting item having a largest usage number of times from among the plurality of setting items; and
notifying the authenticated user of a recommended setting item associated with the specified setting item.

15. A non-transitory computer-readable storage medium storing a program for causing a computer to execute the method according to claim 14.

\* \* \* \* \*